United States Patent
Carlson et al.

(10) Patent No.: US 10,675,702 B2
(45) Date of Patent: Jun. 9, 2020

(54) JOINING OF LIGHT METAL ALLOY WORKPIECES TO STEEL WORKPIECES USING RESISTANCE SPOT WELDING AND ADHESIVE

(71) Applicant: GM GLOBAL TECHNOLOGY OPERATIONS LLC, Detroit, MI (US)

(72) Inventors: Blair E. Carlson, Ann Arbor, MI (US); David R. Sigler, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 15/434,760

(22) Filed: Feb. 16, 2017

(65) Prior Publication Data

US 2017/0232548 A1    Aug. 17, 2017

Related U.S. Application Data

(60) Provisional application No. 62/295,609, filed on Feb. 16, 2016.

(51) Int. Cl.
*B23K 11/11* (2006.01)
*B23K 11/20* (2006.01)
(Continued)

(52) U.S. Cl.
CPC ............ *B23K 11/20* (2013.01); *B23K 11/115* (2013.01); *C09J 5/06* (2013.01); *C09J 5/10* (2013.01); *B23K 2103/20* (2018.08)

(58) Field of Classification Search
CPC ... B23K 11/115; B23K 11/20; B23K 2103/20; C09J 5/06; C09J 5/10
(Continued)

(56) References Cited

U.S. PATENT DOCUMENTS 5,302,797 A    4/1994    Yasuyama et al.
5,304,769 A    4/1994    Ikegami et al.
(Continued)

FOREIGN PATENT DOCUMENTS

CN    1946506    4/2007
CN    102059439   5/2011
(Continued)

OTHER PUBLICATIONS

Wang et al., "Interface microstructure and weld strength of steel/aluminum alloy joints by resistance spot welding," Mechanics and Materials, vols. 117-119 (2012) pp. 1895-1899. Applied.
(Continued)

*Primary Examiner* — Tu B Hoang
*Assistant Examiner* — Tiffany T Tran
(74) *Attorney, Agent, or Firm* — Reising Ethington P.C.

(57) ABSTRACT

A method of adhesive weld bonding a light metal workpiece and a steel workpiece is disclosed that includes applying a plurality of discrete adhesive ribbons to a faying surface of the light metal workpiece, the faying surface of the steel workpiece, or both faying surfaces, and then assembling the workpieces together to establish one or more adhesive zones between the faying surfaces of the light metal and steel workpieces and a plurality of adhesive free zones amongst the adhesive zone(s). The method further includes forming a resistance spot weld that bonds the the light metal workpiece and the steel workpiece together at a spot weld location within one of the adhesive free zones. The formed spot weld includes a weld joint contained within the light metal workpiece that bonds to the faying interface of the steel workpiece.

18 Claims, 3 Drawing Sheets

(51) Int. Cl.
  *B23K 11/34* (2006.01)
  *C09J 5/10* (2006.01)
  *C09J 5/06* (2006.01)
  *B23K 103/20* (2006.01)

(58) Field of Classification Search
  USPC ......... 219/91.2, 117, 118, 86.1, 119, 148, 78
  See application file for complete search history.

(56) References Cited

U.S. PATENT DOCUMENTS

| | | | |
|---|---|---|---|
| 5,783,794 | A | 7/1998 | Oikawa et al. |
| 6,037,559 | A * | 3/2000 | Okabe ................... B23K 11/115 219/91.23 |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 * | 11/2011 | Miyamoto ............ B23K 11/115 219/118 |
| 8,487,206 | B2 | 7/2013 | Urushihara et al. |
| 8,502,105 | B2 | 8/2013 | Tanaka et al. |
| 9,676,065 | B2 | 6/2017 | Sigler et al. |
| 2005/0218121 | A1 | 10/2005 | Hayashi et al. |
| 2005/0247679 | A1 | 11/2005 | Wang |
| 2007/0212565 | A1 | 9/2007 | Urushihara et al. |
| 2008/0081149 | A1 * | 4/2008 | Fuerst ..................... B32B 15/08 428/137 |
| 2008/0235932 | A1 * | 10/2008 | Wang ..................... B23K 11/115 29/464 |
| 2009/0255908 | A1 | 10/2009 | Sigler et al. |
| 2009/0278371 | A1 * | 11/2009 | Fuchs ..................... B23K 11/11 296/29 |
| 2011/0097594 | A1 * | 4/2011 | Tanaka .................. B23K 11/115 428/594 |
| 2011/0123825 | A1 * | 5/2011 | Sakurai ................. B23K 11/115 428/650 |
| 2012/0021240 | A1 | 1/2012 | Urushihara et al. |
| 2012/0141829 | A1 * | 6/2012 | Oikawa ................. B23K 11/115 428/683 |
| 2013/0189023 | A1 | 7/2013 | Spinella |
| 2013/0263638 | A1 | 10/2013 | Gugel et al. |
| 2014/0076859 | A1 * | 3/2014 | Sigler ..................... B23K 11/11 219/91.2 |
| 2014/0305912 | A1 | 10/2014 | Taniguchi et al. |
| 2014/0360986 | A1 | 12/2014 | Sigler et al. |
| 2015/0000956 | A1 * | 1/2015 | Spinella ................. B23K 11/20 174/126.2 |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0167158 | A1 * | 6/2016 | Spinella ............. B23K 11/3009 403/270 |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0216956 | A1 * | 8/2017 | Kotschote ............. B23K 11/115 |
| 2017/0225262 | A1 | 8/2017 | Sigler et al. |
| 2017/0225263 | A1 | 8/2017 | Sigler et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291247 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297136 | A1 | 10/2017 | Brown et al. |
| 2017/0297137 | A1 | 10/2017 | Perry et al. |
| 2017/0297138 | A1 | 10/2017 | Sigler et al. |
| 2017/0304925 | A1 | 10/2017 | Sigler et al. |
| 2017/0348789 | A1 * | 12/2017 | Frohlich ................. B23K 11/11 |
| 2017/0349220 | A1 * | 12/2017 | Yamada ................. B21D 39/00 |
| 2017/0361392 | A1 | 12/2017 | Sigler et al. |
| 2018/0056432 | A1 * | 3/2018 | Lindner ................. B23K 9/173 |
| 2018/0251617 | A1 * | 9/2018 | Takaiwa .................. C08K 5/41 |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strenth steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

(56) References Cited

OTHER PUBLICATIONS

Sigler et al., U.S. Appl. No. 15/907,996 entitled "Improving Mechanical Performance of Al-Steel Weld Joints by Limiting Steel Sheet Deformation," filed Feb. 28, 2018.
Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.
Sigler et al., U.S. Appl. No. 15/976,163 entitled "Multi-Step Direct Welding of an Aluminum-Based Workpiece to a Steel Workpiece," filed May 10, 2018.
Yang et al., U.S. Appl. No. 15/992,748 entitled "Electrode for Resistance Spot Welding of Dissimilar Metals," filed May 30, 2018.

\* cited by examiner

JOINING OF LIGHT METAL ALLOY WORKPIECES TO STEEL WORKPIECES USING RESISTANCE SPOT WELDING AND ADHESIVE

CROSS-REFERENCE TO RELATED APPLICATION(S)

This application claims the benefit of U.S. Provisional Application No. 62/295,609, which was filed on Feb. 16, 2016. The aforementioned provisional application is incorporated herein by reference in its entirety.

INTRODUCTION

Resistance spot welding finds broad application in welding thin—typically less than 6 millimeter thick—metal workpieces together across a variety of manufacturing industries. For example, resistance spot welding is widely used in the construction and fabrication of automotive assemblies including structural components such as rocker panels or B pillars. Additionally, "hang-on" parts such as doors, decklids, and hoods usually comprise an aesthetically-pleasing outer panel, visible to an observer outside the vehicle, coupled at its periphery to an inner panel, which is hidden from view and often obscured by a plastic or fabric covering. Such hang-on parts frequently incorporate structural features or members—such as hinge reinforcements, lock reinforcements, or door intrusion reinforcements—that may be secured to the hidden-from-view inner panel by a series of spaced-apart resistance spot welds. These resistance spot welds comprise a solidified region common to both workpieces also known as a weld nugget that incorporates previously-melted and co-mingled portions of both workpieces. The weld nugget which secures the workpieces to one another.

In some cases, the series of discrete spot welds may be combined with a co-located bead of adhesive in an effort to promote improvement in weld nugget stiffness and fatigue performance. The combined use of resistance spot welding and an applied adhesive is referred to generally in this disclosure as adhesive weld bonding. Suitable adhesives that may be employed in the practice of weld bonding may include one-part adhesives or two-part adhesives. One-part adhesives are generally applied to an intended surface and then cured by the subsequent exposure to heat, UV light, moisture, oxygen, and the like. Two-part adhesives are generally comprised of two individual yet reactive constituents that are combined just prior to being applied to an intended surface followed by self-curing as a result of their reactive interaction.

The practice of adhesive weld bonding has been employed in the past to join together metal workpieces having similar compositions such as, for instance, steel workpieces to steel workpieces or aluminum alloy workpieces to aluminum alloy workpieces. But the desire to incorporate lighter weight materials into a vehicle body structure has resulted in a desire to manufacture assemblies where a steel workpiece is joined to an abutting light metal workpiece composed of aluminum or magnesium. The joining of these dissimilar metals by resistance spot welding is itself challenging due to their markedly different physical properties (e.g., melting point, thermal conductivity, electrical conductivity, strength at elevated temperatures, etc.) and the presence of a mechanically tough, electrically insulating, and self-healing refractory oxide layer (or layers) on the aluminum/magnesium workpiece. This challenge may be heightened during adhesive weld bonding due to the presence of the adhesive.

SUMMARY

A method of adhesive weld bonding a light metal workpiece and a steel workpiece together may have several steps according to one embodiment of the disclosure. First, a light metal workpiece having a faying surface and a steel workpiece having a faying surface is provided. Second, a plurality of discrete adhesive ribbons is applied to the faying surface of the light metal workpiece, the faying surface of steel workpiece, or the faying surfaces of both the light metal workpiece and the steel workpiece. Third, the light metal workpiece and the steel workpiece together are assembled together in overlapping fashion such that their faying surfaces establish a faying interface. Moreover, during assembly of the light metal and steel workpieces, the discrete adhesive ribbons are spread out laterally between the faying surface of the light metal workpiece and the faying surface of the steel workpiece so that a plurality of adhesive free zones are established amongst one or more adhesive zones. Fourth, a resistance spot weld that bonds the light metal workpiece and the steel workpiece together is formed at a spot weld location within one of the adhesive free zones. The formed spot weld comprises a weld joint contained within the light metal workpiece that bonds to the faying interface of the steel workpiece.

Practices of the aforementioned embodiment may be further defined. For instance, the light metal workpiece may be an aluminum alloy workpiece. As another example, a plurality of resistance spot welds may be formed between the light metal workpiece and the steel workpiece. In that regard, each of the plurality of spot welds is formed at a spot weld location within one of the plurality of adhesive free zones. Still further, the plurality of discrete adhesive ribbons may comprises a plurality of discrete adhesive ribbons in the form of elongated strips that are deposited along a weld line that extends through and connects a plurality of spot weld locations when the light metal workpiece and the steel workpiece are assembled in overlapping fashion. This same plurality of discrete adhesive ribbons may further include, if desired, a discrete adhesive ribbon in the form of an elongated strip that is laterally displaced from the weld line and extends alongside one of the spot weld locations. And in yet another example, the plurality of discrete adhesive ribbons may comprise a plurality of discrete adhesive ribbons in the form of annuluses, with each annulus of adhesive surrounding a spot weld location. In whatever form the adhesive ribbons may assume, each of the ribbons may have a width ranging from 2 mm to 10 mm, a height ranging from 0.2 mm to 2 mm, and a length ranging from 20 mm to 200 mm.

A method of adhesive weld bonding a light metal workpiece and a steel workpiece together may have several steps according to another embodiment of the disclosure. First, a plurality of discrete adhesive ribbons are applied to a faying surface of a first metal workpiece such that none of the adhesive ribbons intrude into any of a plurality of spot weld locations of the first metal workpiece. The first metal workpiece is one of a light metal workpiece or a steel workpiece. Second, the metal workpiece together is assembled with a second metal workpiece in overlapping fashion to form a stack-up assembly in which the faying surface of the first metal workpiece and a faying surface of the second metal workpiece are brought together causing the discrete adhesive ribbons originally applied to the faying surface of the first metal workpiece to spread laterally between the faying surfaces of the first and second metal workpieces to establish one or more adhesive zones and a plurality of discrete adhesive free zones amongst the one or more adhesive zones. Each of the spot weld locations of the first metal workpiece are located within one of the adhesive free zones. As for the composition of the second metal workpiece, it is the other of a light metal workpiece or a steel workpiece such that the first and second metal workpieces are of dissimilar base metal compositions. Third, a resistance spot weld that bonds the first metal workpiece and the second metal workpiece together is formed at each of the spot weld locations of the first metal workpiece and corresponding spot weld locations of the second metal workpiece. Each of the spot welds is formed within one of the plurality of adhesive free zones and comprises a weld joint contained within the first or second metal workpiece, whichever is the light metal workpiece, that bonds to the faying surface of the other of the first or second metal workpiece.

Practices of the aforementioned embodiment may be further defined. For instance, the light metal workpiece may be an aluminum alloy workpiece. As another example, the plurality of discrete adhesive ribbons applied to the faying surface of the first metal workpiece may comprise a plurality of discrete adhesive ribbons in the form of elongated strips that are deposited along a weld line that extends through and connects each of spot weld locations of the first metal workpiece. This same plurality of discrete adhesive ribbons may further include, if desired, a discrete adhesive ribbon in the form of an elongated strip that is laterally displaced from the weld line and extends alongside one of the spot weld locations of the first metal workpiece. Still further, the plurality of discrete adhesive ribbons may comprise a plurality of discrete adhesive ribbons in the form of annuluses, with each of the spot weld locations of the first metal workpiece being surrounded by an annulus of adhesive. In yet another example, a thermally affected zone of one or more of the resistance spot welds formed between the first and second metal workpieces is also included within the adhesive free zone corresponding to those one or more resistance spot welds. In whatever form the adhesive ribbons may assume, each of the ribbons may have a width ranging from 2 mm to 10 mm, a height ranging from 0.2 mm to 2 mm, and a length ranging from 20 mm to 200 mm. Each of the adhesive ribbons may be a heat curable epoxy or some other curable adhesive composition.

DETAILED DESCRIPTION

Figure 1:
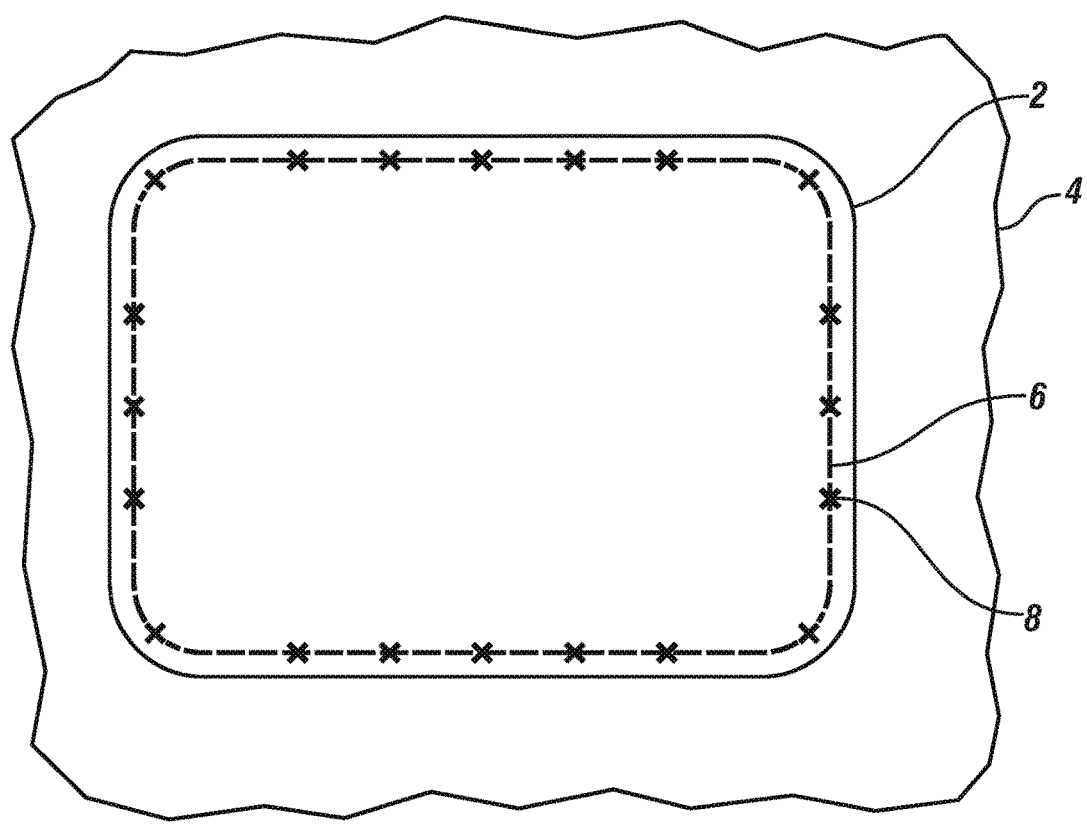
FIG. 1 is a plan view generally showing the placement and location of an adhesive bead and intermittent resistance spot welds under the practices of the prior art.

The present disclosure involves a method for joining a steel workpieces to a light metal workpiece such as, for example, an aluminum alloy workpiece or a magnesium alloy workpiece. The disclosed procedure uses adhesive weld bonding which, as previously described, is a combination of resistance spot welding and adhesive bonding, to securely join the workpieces together at a joining region such as overlapping flanges. Resistance spot welding is practiced at one or more designated spot weld locations and adhesive bonding is relied on to adhere portions of the workpieces together between the spot weld locations. The term "spot weld location" as used herein refers to the portions of the light metal workpiece and the steel workpieces that are engaged under pressure by welding electrodes and which are ultimately bonded together by a spot weld, which comprises a weld joint contained within the light metal workpieces, derived from passing electrical current between the electrodes. The term "spot weld location" may thus refer individually to the portion of the light metal workpiece or the portion of the steel workpiece that is predetermined to participate in spot welding, or it may refer collectively to both the portion of the light metal workpiece and the portion of steel workpiece that are predetermined to participate in spot welding when those two workpiece are assembled together in overlapping fashion, depending on context.

The disclosed method joins overlapping portions of a steel workpiece and a light metal workpiece over a broad region by implementing a practice of adhesive weld bonding where one or more adhesive zones are established between the confronting steel and light metal workpiece faying surfaces and, subsequently, one or more spot welds are formed within adhesive free zones established amongst the one or more adhesive zones to produce a weld joint (or joints) that bond or braze the workpiece surfaces together at their faying interface at each spot weld location. As such, the one or more spot welds are positioned to isolate the adhesive zones from the thermal effects of the spot welds and to distance the spot welds from the adhesive zones. In one particular embodiment of the disclosed adhesive weld bonding method, each of the discrete adhesive zones may be formed by applying a discrete ribbon lengthwise along one or both of the steel and light metal workpiece faying surfaces in the form of a strip or "stitch" and then assembling the workpieces in overlapping fashion to spread the adhesive ribbon therebetween into the adhesive zone that is segregated from individual future spot weld locations. In another embodiment of the disclosed adhesive weld bonding method, each of the discrete adhesive zones may be formed by applying a discrete ribbon in an annulus that surrounds an individual future spot weld location and then assembling the workpieces in overlapping fashion to, like before, spread the adhesive ribbon therebetween into the adhesive zone that is segregated from individual future spot weld locations.

The disclosed adhesive weld bonding method—specific embodiments of which are described in more detail below— is different from conventional joining practices in which resistance spot welding and adhesive bonding are employed in conjunction with one another. In conventional practices, for example, a continuous bead of adhesive is placed on a faying surface of one or both of a pair of separated workpieces in sufficient quantity to insure that the adhesive bead spreads liberally between the faying surfaces when the workpieces are brought together to establish a layer of "weld-through adhesive" that encompasses the predetermined areas of future spot weld locations. Spot weld operations are then conducted throughout the assembled stack-up of overlapping workpieces to form joints that extend through the weld-through adhesive. A representative depiction of such a conventional adhesive weld bonding practice is illustrated in FIG. 1. It should be appreciated that the use of adhesive weld bonding is broadly applicable to the joining of many structural components, including a wide variety of automotive assemblies. The illustration shown at FIG. 1, and the similar illustration shown later in FIG. 4 as applicable to the presently disclosed method, are thus intended only to illustrate representative features of these practices and not to limit or restrict application of the claimed process to any particular part or geometry.

Referring now to FIG. 1, a first metal workpiece 2 in the form of a sheet metal patch and a second metal workpiece 4 in the form of an underlying sheet metal panel are shown, in plan view, in an assembled state in preparation for resistance spot welding with the first metal workpiece 2 overlapping a portion of the second metal workpiece 4. In the region of overlap, a continuous bead of adhesive 6 has been laid down along the perimeter of the first metal workpiece 2 between the confronting faying surfaces of the metal workpieces 2, 4 that, in actuality, is spread laterally beyond the dashed line shown in FIG. 1 when the metal workpieces 2, 4, are pressed together during assembly and may actually be expelled out of and beyond the region of overlap. A series of weld locations 8 are also marked in various locations between the metal workpieces 2, 4 where spot welding is to be conducted in the future. The continuous bead of adhesive 6 is generally deposited along a path that traverses directly through or very close to the several spot weld locations 8. In fact, here in FIG. 1, some of weld locations 8 are shown located on the curved 'corner' portions of the adhesive bead 6 to emphasize that the weld locations are oftentimes positioned coincident with the line of adhesive bead 6.

Once the metal workpieces 2, 4 are assembled following application of the adhesive bead 6, a pair of facially aligned welding electrodes (not shown) is positioned at one of the spot weld locations 8 with one of the electrodes being brought into contact with the first metal workpiece 2 and the other electrode being brought into contact with the second metal workpiece 4. Pressure is applied to the welding electrodes to force the faying surfaces of first and second metal workpieces 2, 4 together which, incidentally, squeezes most (but not all) of the intervening adhesive outwardly away from the center of the spot weld location 8. An electric current is then passed through the welding electrodes at the chosen spot weld location 8 to melt and comingle portions of each of the metal workpieces 2, 4. After the cessation of current flow between the welding electrodes, the weld pool formed between the metal workpieces 2, 4 solidifies into a weld nugget. The welding electrodes are then opened, repositioned at another weld location 8, and the process sequence is repeated until all of the requisite spot welds have been made.

The above-described conventional practice and use of a "weld-through adhesive" has been used with varying degrees of success when both the first and second workpieces 2, 4 are composed of the same base metal compositions such as, for example, steel-to-steel or aluminum alloy-to-aluminum alloy or magnesium alloy-to-magnesium alloy. This is because the melting temperatures of similarly-composed metal workpieces—whether iron-based, aluminum-based or magnesium-based—are sufficient to decompose and degrade the intermediate adhesive to produce char, ash, and debris in general, in addition to evolving gas(es) that leave behind porosity, all of which becomes incorporated into a weld nugget that completely consumes the faying interface established between the metal workpieces 2, 4 at the spot weld location and extends into each metal workpiece 2, 4. Indeed, when the molten weld pool formed between two similarly-composed metal workpieces 2, 4 solidifies into a weld nugget, it tends to solidify inwardly from its outer boundary, resulting in debris and decomposition products and other weld defects being pushed into a central interior region within the weld nugget. When sequestered in this location, the weld defects are rendered generally innocuous, thereby permitting the formation of a robust spot weld despite the presence of the adhesive.

When, however, the metal workpieces are composed of dissimilar materials having markedly dissimilar melting points, such as the case when spot welding steel to an aluminum alloy or a magnesium alloy, the molten pool created by the resistive heat of the passing electrical current is not formed equally in each of the metal workpieces; rather, the molten weld pool tends to form only the lower melting point material (e.g., the aluminum alloy or magnesium alloy workpiece) in which case the weld pool does not consume the faying interface established between of the overlapping metal workpiece but, instead, merely wets the faying surface of the higher melting point material (e.g., the steel workpiece). For example, the great disparity in melting points between steel workpieces (~1300° C. to 1500° C.) and aluminum alloy workpieces (~600° C.) typically used in automotive manufacturing typically results in a molten weld pool being formed and contained within the much lower melting point aluminum alloy. Under these circumstances, the solidification of the molten pool drives any debris, decomposition products, porosity, and other weld defects towards the plane of the faying interface of the steel and aluminum alloy workpieces. The broad dispersal of weld defects along the faying interface of the steel and aluminum alloy workpieces, in turn, may negatively affect the strength of the weld joint, particularly its peel and cross-tension strength.

The unique spot welding mechanism including the solidification behavior of a molten weld pool that occurs in dissimilar metal workpieces is described in more detail with reference to FIG. 2. There, a simplified view of a stack-up assembly 10 that includes a light metal workpiece 12 (e.g., aluminum alloy or magnesium alloy) and a steel workpiece 14 is shown along with an interposed adhesive layer 16. Each of the steel and light metal alloy workpieces may be a formed and stamped wrought panel or sheet metal layer, a cast article, a smaller component such as a reinforcing plate or bracket, or any other spot-weldable material. As for their specific compositions, any of a wide variety of light metals and steels may be employed. For example, the light metal workpiece may be an aluminum alloy or a magnesium alloy. Some specific examples of aluminum and magnesium alloys that may be used include an aluminum-magnesium alloy (e.g., AA5754 and AA5182), an aluminum-silicon alloy, an aluminum-magnesium-silicon alloy (e.g., AA6111 and AA6022), a aluminum-zinc alloy (AA7003 and AA7055), a Al-10Si—Mg aluminum die casting alloy, AZ91D die cast or wrought (extruded or sheet) magnesium alloy, AZ31B die cast or extruded (extruded or sheet) magnesium alloy, and AM60B die cast magnesium alloy. The light metal workpiece 12 may include a native refractory oxide surface layer or some other alternative conversion coating. As for the steel workpiece 14, it may be bare or coated interstitial-free steel, dual-phase steel, high-strength low-alloy steel, complex phase steel, bake-hardenable steel, martensitic steel, transformation induced plasticity steel, twining induced plasticity steel, or boron steel (such as when the steel workpiece is press-hardened steel), to name but a few examples. If coated, the steel workpiece 14 may include a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy.

When practicing conventional adhesive weld boding, the adhesive layer 16 would have originally been broadly applied to make extensive contact with each of the opposed faying surfaces 18, 20 of the workpieces 12, 14 including through the intended spot weld location. The adhesive layer 16 may be any organic or inorganic material that is capable of bonding to each of the compositions of the light metal and steel workpieces 12, 14. Suitable adhesives, which may incorporate one or more chemical entities, can be any of a wide variety of curable polymer systems such as, for example, heat curable epoxies and polyurethanes. Some specific examples of adhesives that may constitute the adhesive layer 16 include but are not limited to Dow Betamate 1486, Henkel 5089, and Uniseal 2343. Moreover, in an effort to achieve a proper viscosity profile for manufacturing operations and to alter the mechanical properties in the adhesive layer 16 after curing, the adhesive may include fillers particles, such as fumed silica particles or other refractory particles, if desired. The depicted stack-up assembly 10 is shown here after the creation of a molten weld pool 22 in the light metal workpiece 14.

In the performance of resistance spot welding, a pair of welding electrodes are clamped in facial alignment at the spot weld location with a first welding electrode 24 being pressed against the light metal workpiece 12 and a second welding electrode 26 being pressed against the steel workpiece 14. Pressure is applied to the stack-up assembly 10 at the weld location by the welding electrodes 24, 26, thus brining the faying surfaces 18, 20 into forced contact. An electrical current is then communicated through the workpieces 12, 14 and between the electrodes 24, 26. This passing electrical current heats, and eventually melts, the light metal workpiece 12 between the facing electrodes 24, 26 to thereby create the molten weld pool 22. And, as shown in FIG. 2, the molten weld pool 22 is confined to the light metal workpiece 12 such that it wets the adjacent faying surface 20 of the unmelted steel workpiece 14.

Upon cessation of electrical current flow between the welding electrodes 24, 26, the molten weld pool 22 solidifies first at locations closest to the first electrode 22, which is typically water cooled, followed by advancement of the solidification front towards the faying surface 20 of the steel workpiece 14. As the molten weld pool 18 solidifies in this manner, weld defects such as filler residue, char, ash, porosity, micro-cracks, shrinkage voids, and residual surface oxides from the light metal workpiece 12 are swept or driven towards the faying surface 20 of the steel workpiece 14 as well. The dispersal of such weld defects at and along the interface of the solidifying molten weld pool 22 and the faying surface 20 of the steel workpiece 14 interferes with the ability of the weld pool 22 to wet the steel workpiece 14 and, consequently, can have an adverse affect on the strength of the final solidified weld joint. Some of those defects, e.g., filler residue, char, and ash, can be attributed to the thermal decomposition of residual adhesive at the spot weld location and can even magnify the complications associated with other defects such as surface oxide residues.

Figure 2:
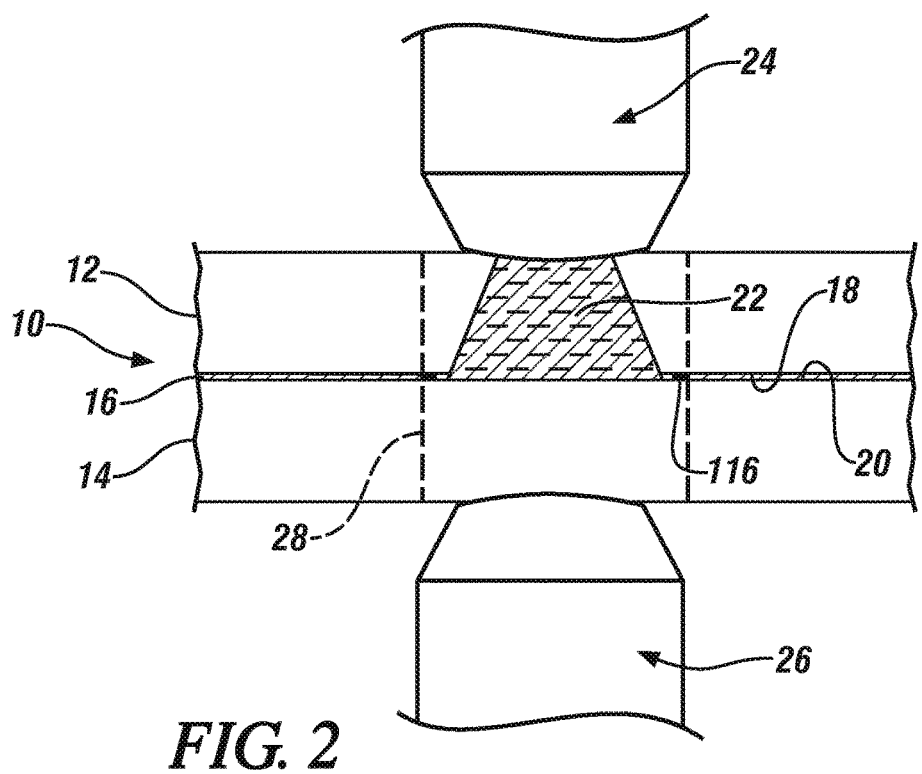
FIG. 2 is a cross-sectional view of workpiece stack-up that includes a steel workpiece (bottom) and an aluminum alloy workpiece (top) during resistance spot welding in which a molten weld pool has been formed within an aluminum workpiece and a thermally affected zone extending beyond the boundary of the molten weld pool has been created according to one embodiment of the disclosure.

Additionally, as is also shown in FIG. 2, a region exists adjacent to and surrounding the molten weld pool 22 within the light metal workpiece 12 and that further extends into the steel workpiece 14 across the faying interface of the workpieces 12, 14 where heat from the spot welding operation is conducted. This regions is termed a "thermally affected zone" (TAZ) and is identified generally by reference numeral 28. Within the thermally affected zone 28, the material of the steel and light metal workpieces 12, 14 is heated and experiences changes in its microstructure, even though the temperatures attained in this region 28 are insufficient to melt the light metal workpieces 12, 14. If some portion of adhesive layer 16 is present in the thermally affected zone 20, that portion of the adhesive layer 16 will be decomposed into decomposition by-products 116 due to the relatively elevated temperatures that are reached in the thermally affected zone 20. These decomposition by-products 116 contribute little or nothing to the overall strength of the adhesive bond that surrounds the weld joint of the inwardly-located spot weld.

Referring now to FIGS. 2-7, the disclosed method addresses the above concerns regarding conventional weld-through adhesive arrangements by applying appropriately sized and spaced adhesive ribbons 30 (FIG. 4) to one or both of the workpiece faying surfaces 18, 20 such that one or more adhesive zones 32 (FIGS. 5-7) ultimately attained between the workpieces 12, 14 are segregated from one or more spot weld locations 36 where a spot weld 38 is formed and, optionally, from the surrounding thermally affected zone 28. That is, during resistance spot welding, the formation of each of the one or more resistance spot welds 38 is carried out in an adhesive-free zone 40 situated within or between discrete adhesive zones 32, as shown best in FIG. 5. By forming the spot weld(s) 38 in the adhesive-free zone(s) 40, the potentially deleterious effects the adhesive may have on the strength of the weld joint(s) are avoided. Additionally, if desired, the adhesive-free zone(s) 40 may be sized to include the thermally affected zone 28 that surrounds the spot weld 38. Keeping adhesive out of the thermally affected zone 28 may be desirable for economic reasons since the decomposed adhesive in the thermally affected zone 28 adds cost to the overall process but does not contribute any adhesive bond strength. Of course, in certain practices of the disclosed method, the thermally affected zone 28 may intrude into one or more of the adhesive zones 32, if deemed acceptable.

The exclusion of adhesive from the spot weld location(s) 36 and optionally the thermally affected zone(s) 28 may require provisions to accommodate the precise application of adhesive ribbons 30 in a predetermined arrangement so that the adhesive zone(s) 32 do not overlap with the spot weld locations(s) 36 and, if desired, the thermally affected zone(s) 28 during fit-up of the metal workpieces 12, 13 and application of pressure by the spot welding electrodes during subsequent spot welding practices. This entails identifying the number and placement of the one or more spot weld locations 36 and the corresponding number, placement, and size of the adhesive ribbons 30 taking into account how and to what extent the ribbons 30 will flow and spread laterally between the faying surfaces 18, 20 when the workpieces 12, 14 are initially assembled in overlapping fashion, thus establishing the adhesive zones 32, as well as when the welding electrodes 24, 26 apply their clamping pressure to workpieces 12, 14 prior to and during electrical current flow. The extent of lateral adhesive flow or "squeezeout" that occurs generally depends on the type, quantity, and shape of the individually applied adhesive ribbons 30, and may be anticipated fairly accurately for process design purposes by modeling, experiment, experience, or any combination of these. In fact, each adhesive ribbon 30 may be spread out into a corresponding discrete adhesive zone 32, or one or more of the adhesive ribbons may merge together into several larger adhesive zones 32 or one continuous adhesive zone 32.

Figure 3:
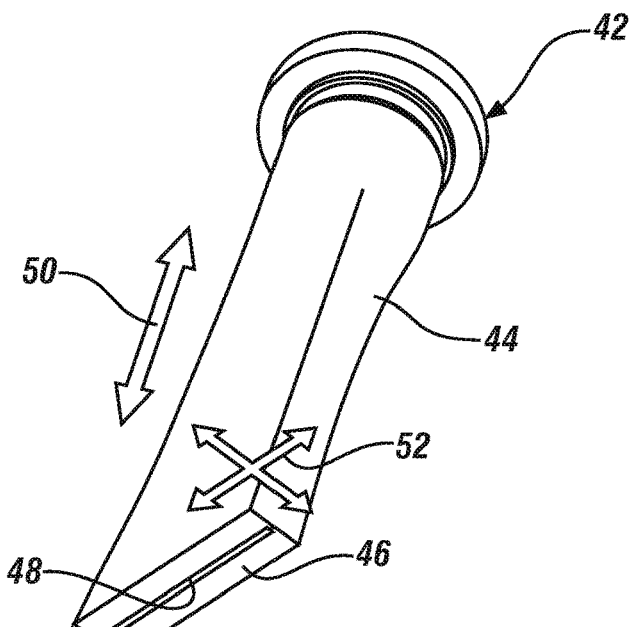
FIG. 3 is a perspective view of an adhesive-dispensing nozzle according to one embodiment of the disclosure.

Because conventional adhesive weld bonding procedures are generally not concerned with precisely controlling the application of adhesive and, in fact, actually seek to apply a considerable excess of adhesive to ensure full coverage at the faying interface, a modified nozzle design may be used during practices of the presently disclosed method. A modified nozzle design constructed to precisely dispense adhesive according to a preferred embodiment is illustrated in FIG. 3 and identified by reference numeral 42. The nozzle 42, a shown, includes a shank portion 44 having an angled end face 46 that defines a narrow slot 48 from which adhesive is exorcised. The slot 48 may have a uniform width as illustrated although slot profiles may be used to provide different cross-sectional adhesive ribbon distributions if desired. The nozzle 42 is mounted on, or supported by, or integral with, as a robotic arm (not shown), which permits the nozzle 42 to be advanced and retracted along an axis parallel to the shank portion 44 as indicated by double arrows 50 and to be displaced laterally in any arbitrary direction as represented by cross arrows 52. An adhesive shutoff valve (not shown) is integrated into the shank portion 44 of the nozzle 42 so that adhesive flow can be shut off abruptly at the nozzle 42 close to the slot 48 in order to ensure that the adhesive ribbons 30 can be precisely applied with unwanted excess adhesive being dispensed from the nozzle 42.

Figure 4:
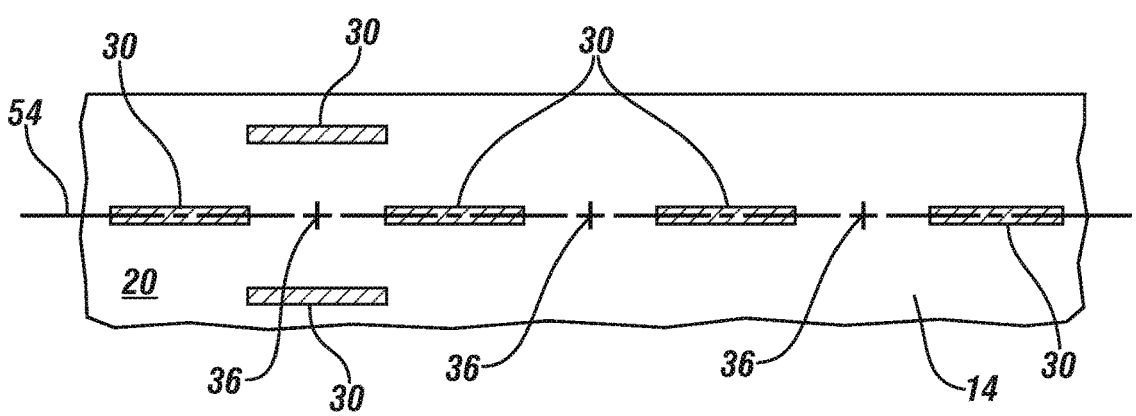
FIG. 4 shows, in a partial cutaway plan view, a portion of a flange of one of the steel or light metal workpieces along with the relative predetermined spot weld locations and the applied adhesive according to one embodiment of the disclosure.
Figure 5:
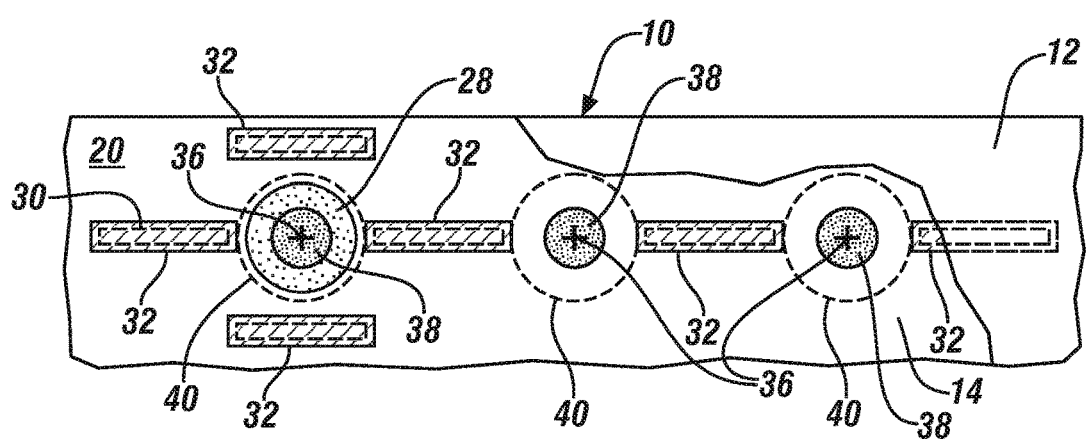
FIG. 5 shows, in a partial cutaway plan view, the flange portion shown in FIG. 4 after a weld joint is made at each of the spot weld locations and further illustrating one arrangement of applied adhesive and resistance spot welds.

In operation, the nozzle 42 is registered relative to one of the workpiece faying surfaces 18, 20 (faying surface 20 is shown in FIGS. 4-5 and referred to moving forward for demonstration purposes with the understanding that the following description may also apply to the faying surface 18 of the light metal workpiece 12) at a location that has been identified for deposition of an adhesive ribbon 30 and which is separated from any of the one or more future spot weld locations 36. The nozzle 42 is set to some small, preset standoff distance from the workpiece faying surface 20. Adhesive is then dispensed from a reservoir (not shown) in communication with the nozzle 42 through the slot 48 while the nozzle 42 traverses the workpiece faying surface 20 at a programmed velocity. Typically, when dispensing adhesive, the nozzle 42 will be inclined at an angle of between 60 degrees and 15 degrees from the workpiece faying surface 20 so that the angled end face 46 of the nozzle 42 forms an acute angle with the vector representing the direction of the forward advancement of the nozzle 42. The nozzle 42 may be permanently mounted to the robot arm at a preferred dispensing angle or there may be some adjustment mechanism that enables such inclination. After an adhesive ribbon 30 of a predetermined shape and volume has been deposited, the flow of adhesive through the slot 48 is halted at the nozzle 42. The nozzle 42 is then retracted slightly and moved into registry with the next location identified for the deposition of an adhesive ribbon 30. This process is repeated until all of the adhesive ribbons 30 have been deposited.

Each of the adhesive ribbons 30 deposited by the nozzle 42 may have a width (short dimension) along the workpiece faying surface 20 that ranges from 2 mm to 10 mm, a height extending upwardly from the workpiece faying surface 20 that ranges from 0.2 mm to 2 mm, and a length (long dimension) extending from one end of the ribbon 30 to the other end of the ribbon 30 that ranges from 20 mm to 200 mm. To aid in the precision placement of ribbons 30 of this size, certain precision control procedures may be employed. For example, the reservoir that feeds adhesive to the nozzle 42 may be a cylindrical container shell that includes an interior screw-driven plunger operated by a servomotor. In this way, the distance of plunger advance may be determined from the number of motor revolutions and the screw thread pitch, which permits, in conjunction with the shell inside diameter, the dispensing of a precise quantity of adhesive. All motions of the nozzle 42 may be servo controlled. Additionally, the movement and adhesive dispensing mechanics of the nozzle 42 may be directed by a programmable controller. The flow of adhesive from the slot 48 of the nozzle 42 may thus be coordinated with the velocity of the nozzle 42, if desired, to assure that the adhesive ribbons 30 are uniform in shape even under variations in velocity such as may occur, for example, if the nozzle 42 traverses a nonlinear path.

The deposition of the adhesive ribbons 30 on the workpiece faying surface 20 may be carried out according to any of a wide variety of adhesive placement patterns. For example, in one embodiment, as shown at FIG. 4, a plurality of adhesive ribbons 30 in the form of elongated strips or "stitches" may be deposited onto the workpiece faying surface 20 along an imaginary weld line that extends through and connects each of the spot weld locations 36 on the steel workpiece 14. Of course, as shown, each pair of adjacent adhesive ribbon stitches are separated by a space that includes a spot weld location 36. Moreover, as is further shown in FIG. 4, additional optional adhesive ribbons 30, also in the form of elongated strips or "stitches," may be deposited on the workpiece faying surface 20 at locations laterally displaced from the weld line 54 and extending alongside the spot weld location(s) 36. The spacing of the adhesive ribbon stitches on the weld line 54 and the placement of the optional adhesive ribbon stitches away from the weld line 54 and alongside the spot weld location(s) 36 is controlled to ensure the establishment of a suitable adhesive free zone 40 for subsequent spot welding.

Following application of the adhesive ribbon stitches along and optionally displaced from the weld line 54 on the faying surface 20 of the steel workpiece 14, the light metal workpiece 12 and the steel workpiece 14 are fit-up and assembled together in overlapping fashion to form the stack-up assembly 10. This is represented in the partial cutaway view of the stack-up assembly 10 depicted in FIG. 5. The overlapping assembly of the workpieces 12, 14 causes the adhesive ribbon stitches to spread laterally between the faying surfaces 18, 20 to establish the one or more adhesive zones 32 while also preserving precisely sized the adhesive free zones 40 at each of the spot weld locations 36. Within each adhesive zone 32, adhesive extends between the faying surfaces 18, 20 of the workpieces 12, 14. Here, in FIG. 5, the size and shape of the originally-present adhesive ribbon stitches is shown in broken lines within each adhesive zone 32 to illustrate in schematic fashion how the ribbon stitches are transformed into the adhesive zones 32. Once the stack-up assembly 10 is fabricated, spot welding is conducted at each spot weld location 36 within the adhesive free zones 40 to form a spot weld 38 and a surrounding thermally affected zone 28. The spot weld 38 includes a weld joint, which is the structure derived from solidification of the molten weld pool 22, contained within the light metal workpiece 12 that is bonded to the faying surface 20 of the steel workpiece 14. And, as explained above, the spot weld 38 is contained within the adhesive free zone 40 and, if desired, so to is the thermally affected zone 20 that surrounds the weld joint within the light metal workpiece 12 and extends into the steel workpiece 14.

Figure 6:
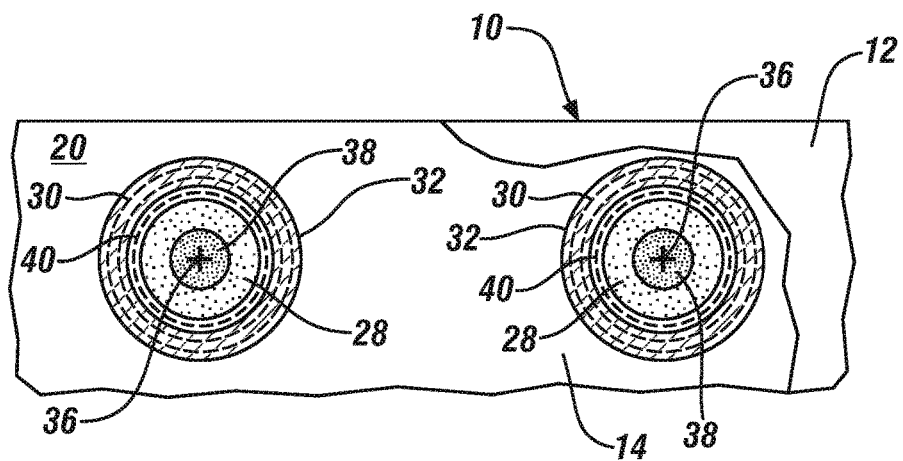
FIG. 6 shows, in a partial cutaway plan view, the flange portion shown in FIG. 4, after a weld joint is made at each of the spot weld locations and further and illustrating an alternative arrangement of applied adhesive and resistance spot welds.

In alternative embodiments, one of which is illustrated in FIG. 6, some or all of the adhesive ribbons 30 may be deposited onto the workpiece faying surface 20 in the form of an annulus that surrounds a spot weld location 36 as opposed to an elongate strip. As shown here, an adhesive ribbon annulus (shown in broken lines) is deposited around the spot weld location 36 and is sized so that a suitable adhesive free zone 40 is established within the adhesive zone 32 that results when the light metal workpiece 12 and the steel workpiece 14 are fit-up and assembled together in overlapping fashion to form the stack-up assembly 10. Once the stack-up assembly 10 is fabricated, spot welding is conducted at each spot weld location 36 within the adhesive free zones 40 to form a spot weld 38 and a surrounding thermally affected zone 28 as previously described. Other adhesive placement patterns besides the specific stitch and annulus embodiments shown in FIGS. 4-6 may of course be practiced despite not being explicitly shown and described here so long as suitably-sized adhesive free zones can be readily established at the faying interface of the light metal and steel workpieces 12, 14.

Figure 7:
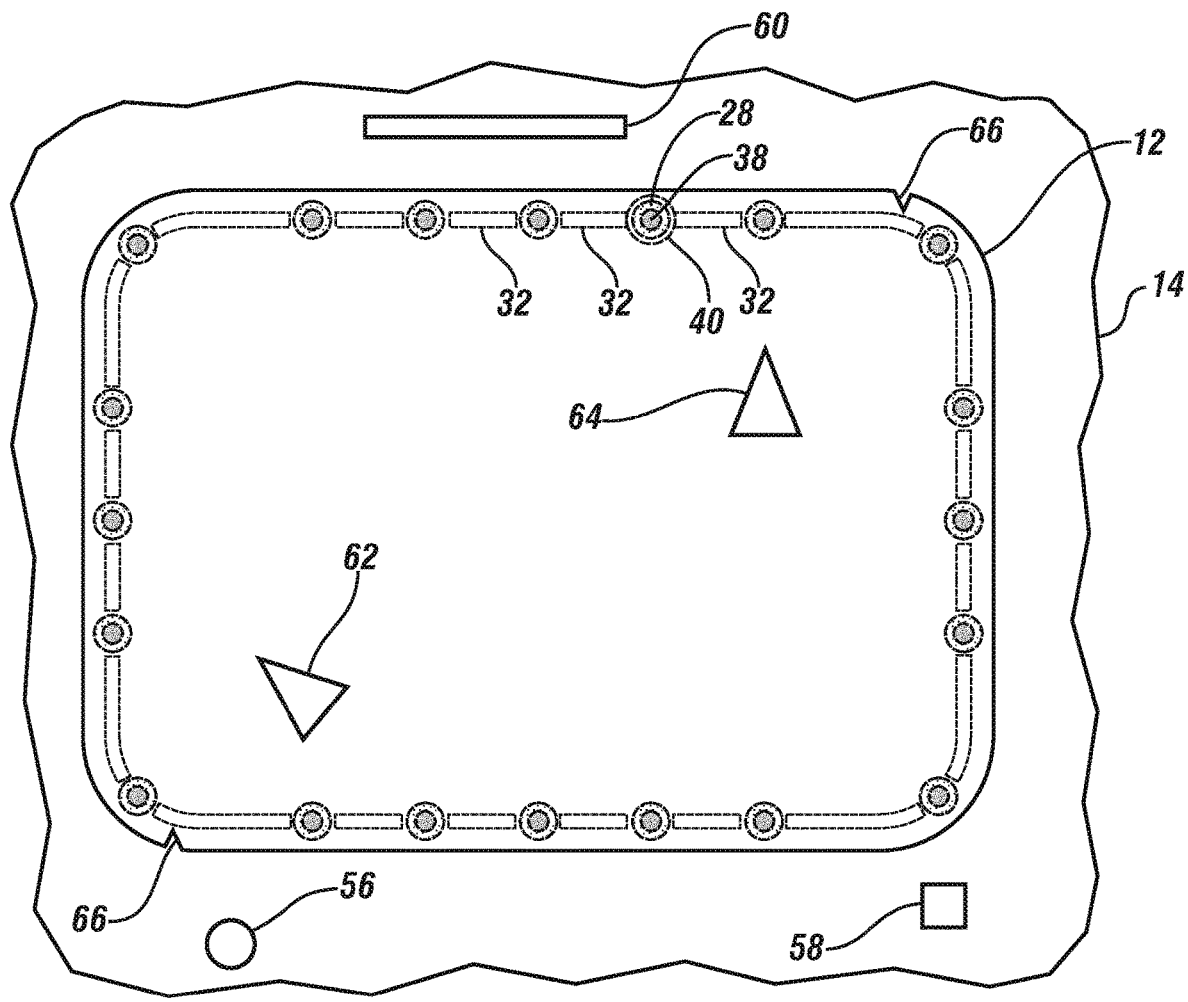
FIG. 7 is a plan view showing a simplified representation of a combination of resistance spot weld joints and adhesive bonded-regions made between a steel workpiece and a light metal workpiece according to practices of the present disclosure and showing recognizable features incorporated into the workpieces to enable registration of the adhesive with the spot weld locations.

In practicing the disclosed method, the adhesive ribbons 30 are applied first to one or both of the workpiece faying surfaces 18, 20, and the two workpieces 12, 14 are then assembled in overlapping fashion into the stack-up assembly 10, which means that the adhesive zones 32 and the adhesive zones 40 are hidden from view when resistance spot welding is being conducted. To help assure proper registration of the welding electrodes 24, 26 with the spot welding locations 36, one or a series of identifiable features may be included in the light metal workpiece 12, the steel workpiece 14, or both workpieces 12, 14, so as to facilitate accurate spot welding practices. FIG. 7, which revisits the simplified component geometries set forth in FIG. 1, illustrates one particular technique that may be followed to make sure that spot welding is reliably performed at the designated spot weld locations 36 within the adhesive free zones 40 and not indiscriminately within the adhesive zones 32 by accident.

In FIG. 7, the light metal workpiece 14 is depicted for demonstration purposes as a patch that overlaps and is adhesive weld bonded to the steel metal workpiece 12 that is depicted as an underlying sheet metal panel. In the region of overlap, a number of discrete adhesive zones 32 are shown positioned along a weld line 54 that includes a plurality of spot welds 38 formed within adhesive free zones 40 (only one shown) as described above. The thermally affected zones 28 associated with the spot welds 38 are also shown here within the adhesive free zones 40. To help assure that accurate spot welding is conducted, the steel workpiece 14 may include identifiable surface features such, for example, a circular opening 56, a square opening 58, and/or a slotted opening 60, although any type of identifiable feature may be employed including surface protrusions or intrusions of any shape. These features 56, 58, 60 may have additional functions related to simplifying fit-up during later stages of vehicle manufacture so that no additional features need be introduced to the stack-up assembly 10.

The surface features 56, 58, 60 may be readily identifiable by a gaging system from either side of the steel workpiece 14 so that their position and orientation can be used to determine whether the workpiece 14 is properly oriented for application of the adhesive ribbons 30 and, following assembly into the stack-up assembly, properly oriented for resistance spot welding. The gaging system may be vision or optical based, or contact probe based, or may simply be a fixturing system designed to engage and reliably orient the light metal and steel workpieces 12, 14. Advantageously, if the adhesive weld bonding process is designed such that the adhesive ribbons are applied to the faying surface 18 of the steel workpiece 14, the steel workpiece 14 may only need be gaged once; that is, the steel workpiece 14 is gaged followed by the application of the adhesive ribbons 30 to its faying surface 18, the assembly of the light metal workpiece 12 to the steel workpiece 14 to form a faying interface between the workpiece 12, 14, and finally the formation of resistance spot welds 38 at the adhesive free zones 40 established between the adhesive zones 32, all without moving the steel workpiece 14 after its initial gaging. To accomplish this series of events as efficiently as possible, the work station be arranged to both dispense adhesive ribbons and to subsequently perform the resistant welding operations to take advantage of the combined positioning accuracies of the gaging system.

Alternatively, two work stations may be employed—one to dispense the adhesive ribbons 30 and another to perform the resistance spot welding—as opposed to a single work station. In this alternative embodiment, and still referring to FIG. 7, each work station is associated with its own independent gaging system. This setup may be utilized if the adhesive ribbons 30 are applied to the faying surface 18 of the light metal workpiece 12. In that regard, the light metal workpiece 12 may be initially positioned with its faying surface 18 accessible to the application of adhesive. Adhesive ribbons 30 are then applied to the faying surface 18 followed by reorienting the light metal workpiece 12 so that its faying surface 18 faces the faying surface 20 of the steel workpiece 14. To assist in such an approach where the light metal workpiece 12 is reoriented, surface locating features 62, 64 such as holes or cutouts or any other features locatable from both sides of the workpiece 14 may be included in the workpiece 14 for proper identification by the independent gaging systems. As another option, notched cutouts 66 located in non-critical areas along the perimeter of the light metal workpiece 14 may be introduced during a blanking or trimming operation to have the same effect at the surface locating features 62, 64.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of adhesive weld bonding an aluminum alloy workpiece and a steel workpiece together, the method comprising:
providing the aluminum alloy workpiece having a faying surface and the steel workpiece having a faying surface;
applying a plurality of discrete adhesive ribbons to the faying surface of the aluminum alloy workpiece, the faying surface of steel workpiece, or the faying surfaces of both the aluminum alloy workpiece and the steel workpiece, the plurality of discrete adhesive ribbons comprising a curable polymer;
assembling the aluminum alloy workpiece and the steel workpiece together in overlapping fashion such that the faying surface of the aluminum alloy workpiece and the faying surface of the steel workpiece establish a faying interface and, wherein, during such assembly, the discrete adhesive ribbons are spread out laterally between the faying surface of the aluminum alloy workpiece and the faying surface of the steel workpiece so that a plurality of adhesive free zones are established amongst one or more adhesive zones;
forming a resistance spot weld that bonds the aluminum alloy workpiece and the steel workpiece together within one of the adhesive free zones, wherein forming the resistance spot weld comprises applying pressure to the aluminum alloy workpiece and the steel workpiece with a pair of opposed welding electrodes to bring the faying surface of the aluminum alloy workpiece and the faying surface of the steel workpiece together at the adhesive free zone and communicating an electrical current between the pair of welding electrodes and through the aluminum alloy workpiece and the steel workpiece at the adhesive free zone to melt the aluminum alloy workpiece and create a molten weld pool that wets the faying surface of the steel workpiece and, upon cessation of the electrical current, solidifies into a weld joint contained within the aluminum alloy workpiece that bonds to the faying surface of the steel workpiece.

2. The method set forth in claim 1, wherein a plurality of resistance spot welds are formed between the aluminum alloy and steel workpieces, and wherein each of the plurality of resistance spot welds is formed at a spot weld location within one of the plurality of adhesive free zones.

3. The method set forth in claim 2, wherein the plurality of discrete adhesive ribbons comprise a plurality of discrete adhesive ribbons in the form of elongated strips that are deposited along a weld line that extends through and connects a plurality of spot weld locations when the aluminum alloy workpiece and the steel workpiece are assembled in overlapping fashion with each pair of adjacent elongated strips of adhesive being separated by a space.

4. The method set forth in claim 3, wherein the plurality of discrete adhesive ribbons further comprise a discrete adhesive ribbon in the form of an elongated strip that is laterally displaced from the weld line and extends alongside one of the spot weld locations.

5. The method set forth in claim 2, wherein the plurality of discrete adhesive ribbons comprise a plurality of discrete adhesive ribbons in the form of annuluses, and wherein each annulus of adhesive surrounds a spot weld location.

6. The method set forth in claim 1, wherein each of the adhesive ribbons has a width ranging from 2 mm to 10 mm, a height ranging from 0.2 mm to 2 mm, and a length ranging from 20 mm to 200 mm.

7. A method of adhesive weld bonding an aluminum alloy workpiece and a steel workpiece together, the method comprising:
applying a plurality of discrete adhesive ribbons to a faying surface of a first metal workpiece, the first metal workpiece being one of the aluminum alloy workpiece or the steel workpiece, the plurality of discrete adhesive ribbons comprising a curable polymer;
assembling the first metal workpiece together with a second metal workpiece in overlapping fashion to form a stack-up assembly in which the faying surface of the first metal workpiece and a faying surface of the second metal workpiece are brought together causing the discrete adhesive ribbons originally applied to the faying surface of the first metal workpiece to spread laterally between the faying surfaces of the first and second metal workpieces to establish one or more adhesive zones and a plurality of discrete adhesive free zones amongst the one or more adhesive zones, wherein the second metal workpiece is the other of the aluminum alloy workpiece or the steel workpiece such that the first and second metal workpieces are of dissimilar base metal compositions;
forming a resistance spot weld that bonds the first metal workpiece and the second workpiece together within each of the plurality of adhesive free zones of the first metal workpiece and the second metal workpiece, each of the spot welds being formed by applying pressure to the first metal workpiece and the second metal workpiece with a pair of opposed welding electrodes to bring the faying surface of the first metal workpiece and the faying surface of the second metal workpiece together at the adhesive free zone and communicating an electrical current between the pair of welding electrodes and through the first metal workpiece and the second metal workpiece to melt whichever of the first metal workpiece or the second metal workpiece is the aluminum alloy workpiece to create a molten weld pool that wets the faying surface of the steel workpiece that is the other of the first metal workpiece or the second metal workpiece and, upon cessation of the electrical current, solidifies into a weld joint contained within the aluminum alloy workpiece that bonds to the faying surface of the steel workpiece.

8. The method set forth in claim 7, wherein the plurality of discrete adhesive ribbons applied to the faying surface of the first metal workpiece comprise a plurality of discrete adhesive ribbons in the form of elongated strips that are deposited along a weld line that extends through and connects each of the spot weld locations of the first metal workpiece.

9. The method set forth in claim 8, wherein the plurality of discrete adhesive ribbons further comprise a discrete adhesive ribbon in the form of an elongated strip that is laterally displaced from the weld line and extends alongside one of the spot weld locations of the first metal workpiece.

10. The method set forth in claim 7, wherein the plurality of discrete adhesive ribbons comprise a plurality of discrete adhesive ribbons in the form of annuluses, and wherein each of the spot weld locations of the first metal workpiece is surrounded by an annulus of adhesive.

11. The method set forth in claim 7, wherein each of the adhesive ribbons has a width ranging from 2 mm to 10 mm, a height ranging from 0.2 mm to 2 mm, and a length ranging from 20 mm to 200 mm.

12. The method set forth in claim 7, wherein a thermally affected zone of one or more of the resistance spot welds formed between the first and second metal workpieces is also included within the adhesive free zone corresponding to those one or more resistance spot welds.

13. The method set forth in claim 7, wherein each of the adhesive ribbons is a heat curable epoxy.

14. The method set forth in claim 1, wherein a thermally affected zone that surrounds the weld joint of the resistance spot weld formed between the aluminum alloy workpiece and the steel workpiece is also included within the adhesive free zone within which the resistance spot weld is formed.

15. A method of adhesive weld bonding, the method comprising: applying a plurality of discrete adhesive ribbons to a faying surface of an aluminum alloy workpiece, a faying surface of steel workpiece, or the faying surfaces of both the aluminum alloy workpiece and the steel workpiece, wherein the plurality of discrete adhesive ribbons comprise a curable polymer; assembling the aluminum alloy workpiece and the steel workpiece together in overlapping fashion such that their faying surfaces establish a faying interface in which a spot weld location of the aluminum alloy workpiece and a corresponding spot welding location of the steel workpiece are aligned, and, wherein during such assembly, the discrete adhesive ribbons are spread out laterally between the faying surface of the aluminum alloy workpiece and the faying surface of the steel workpiece to establish one or more adhesives zones and an adhesive free zone that encompasses the spot weld location of the aluminum alloy workpiece and the corresponding spot weld location of the steel workpiece; pressing a welding electrode against the aluminum alloy workpiece at the spot weld location of the aluminum alloy workpiece and pressing another welding electrode against the steel workpiece at the spot welding location of the steel workpiece, the welding electrodes applying pressure to the aluminum alloy workpiece and the steel workpiece and bringing the faying surface of the aluminum alloy workpiece and the faying surface of the steel workpiece together at the adhesive free zone; communicating an electrical current between the welding electrodes and through the aluminum alloy workpiece and the steel workpiece at the adhesive free zone to melt the aluminum alloy workpiece and create a molten weld pool within the aluminum alloy workpiece that wets, but does not consume, the faying surface of the steel workpiece; and ceasing communication of the electrical current to thereby cause the molten weld pool to solidify into a weld joint within the adhesive free zone that is contained within the aluminum alloy workpiece and bonds to the faying surface of the steel workpiece, and wherein a thermally affected zone that surrounds the weld joint is also included within the adhesive free zone between the aluminum alloy workpiece and the steel metal workpiece.

16. The method set forth in claim 15, wherein the plurality of discrete adhesive ribbons comprise a plurality of elongated strips of adhesive.

17. The method set forth in claim 15, wherein the plurality of discrete adhesive ribbons comprise a plurality of discrete adhesive ribbons in the form of annuluses.

18. The method set forth in claim 15, wherein the plurality of discrete adhesive ribbons comprise a heat curable epoxy.

* * * * *